UNITED STATES PATENT OFFICE.

JEAN JOSEPH AUGUSTE TRILLAT, OF PARIS, FRANCE, ASSIGNOR TO LA SOCIÉTÉ CHIMIQUE DES USINES DU RHÔNE, ANCIENNEMENT GILLIARD, P. MONNET ET CARTIER, OF LYONS, FRANCE.

FORMALDEHYDE SOLUTION.

SPECIFICATION forming part of Letters Patent No. 628,502, dated July 11, 1899.

Application filed November 16, 1897. Serial No. 658,754. (No specimens.)

*To all whom it may concern:*

Be it known that I, JEAN JOSEPH AUGUSTE TRILLAT, of Paris, France, have invented certain new and useful Improvements in Disinfectants, (patented in Great Britain, No. 20,622, September 17, 1896,) of which the following is a specification.

The disinfecting properties of formaldehyde have been well known for many years, but practical difficulties have existed in applying same. One of the chief difficulties is due to the ready manner in which formaldehyde polymerizes and becomes converted into substances practically useless for the purpose of disinfecting. Various methods have been adopted for obtaining formaldehydic vapors from their solution. Formic aldehyde is usually dissolved in water for preservation and transportation and has been administered by driving off the disinfectant in gas or vapor from its solution by heating the latter. This has involved the necessity for considerable heat, and the disadvantage that in some cases the effective power of the disinfectant is reduced by the presence of aqueous vapors in the gases evolved from the solution, while in other cases it has been found that polymerization takes place, so that the vapors cannot be driven off or can only be driven off to a limited extent. My invention aims to avoid these disadvantages and to provide various improvements in this art.

To this end in accordance with my invention I provide a new article of manufature, consisting of a solution of formaldehyde or of a source thereof—as, for example, one of its polymers—and a neutral liquid of a low boiling-point—*i. e.*, at or below 30° centigrade.

In carrying out my invention I preferably use formaldehyde in connection with an alkyl chlorid, such as ethyl chlorid or methyl chlorid, for the purpose of obtaining and applying formaldehydic vapors. Either gaseous formaldehyde or its polymer—solid trioxymethylene—may be employed. As these bodies are insoluble in the aforesaid ethers, it is necessary to dissolve them first in an appropriate solvent of low boiling-point. Methylic alcohol has been proved to be very appropriate for this purpose, as a very small quantity is required to dissolve the disinfecting agent. To this solution is added the required quantity of the alkyl chlorid, so as to produce the necessary volatile character.

It is necessary for the effective carrying out of this invention that the solvent chosen be of as low a boiling-point as possible, so as not to hinder the action of the ethyl chlorid or methyl chlorid which is to be mixed with the formaldehyde solution. Whether formaldehyde or trioxymethylene be used, there will be found mixed in the resulting solution polymerized and unpolymerized formaldehyde.

The solution is preferably confined in a closed vessel of such character that it can be grasped by the hand or otherwise to receive a slight increase of temperature of the air or of the hand to the solution, whereby the latter will become volatilized and will generate sufficient pressure to discharge the solution from the vessel. When the vapors so formed are mixed at once with a large quantity of air, no trace of polymerization takes place. By this method the whole of a given quantity of formaldehyde can be transformed at the ordinary temperature into unpolymerized vapors. The vessel is preferably provided with a neck having a capillary outlet closed by a stopper, so that the discharge of the contents can be regulated.

The method of administering disinfectants consists in confining a solution of formaldehyde and a readily-volatilizable liquid and applying it by volatilizing the liquid and thereby generating a pressure and employing such pressure for jetting or spraying the solution in the place or on the object to be disinfected.

What I claim, and desire to secure by Letters Patent, is—

1. The improved article of manufacture consisting of a solution of formaldehyde and a neutral liquid of a boiling-point at or below 30° centigrade.

2. As a new article of manfacture, a solution of polymerized and unpolymerized formic aldehyde and a substance volatilizable at or below 30° centigrade.

3. As a new article of manufacture, a solution containing formic aldehyde and an alkyl chlorid.

4. As a new article of manufacture a solution containing formic aldehyde and ethyl chlorid.

In witness whereof I have hereunto signed my name in the presence of two subscribing witnesses.

JEAN JOSEPH AUGUSTE TRILLAT.

Witnesses:
EDWARD P. MACLEAN,
EDMOND RAUQUIEL.